United States Patent [19]

Foggini

[11] Patent Number: 4,807,490
[45] Date of Patent: Feb. 28, 1989

[54] PREFORMED INTEGRAL COATING, PARTICULARLY FOR MOTOR VEHICLE GEAR SHIFT LEVERS

[76] Inventor: Giovanni Foggini, Corso Matteotti, 23 - Torino, Italy

[21] Appl. No.: 140,915

[22] Filed: Dec. 30, 1987

Related U.S. Application Data

[63] Continuation of Ser. No. 884,841, Jul. 11, 1986, which is a continuation of Ser. No. 703,163, Feb. 19, 1985, Pat. No. 4,617,834.

[30] Foreign Application Priority Data

Apr. 1, 1981 [IT] Italy .................... 53070/81[U]

[51] Int. Cl.⁴ .................... G05G 1/10; G05G 1/04
[52] U.S. Cl. .................... 74/543; 74/523
[58] Field of Search .................... 74/523, 543, 473 P, 74/473 R, 18.1, 18, 566

[56] References Cited

U.S. PATENT DOCUMENTS

| | | | |
|---|---|---|---|
| 2,121,989 | 6/1938 | Schnase et al. | 74/543 |
| 2,496,700 | 2/1950 | Cole | 74/543 |
| 2,722,137 | 11/1955 | Russell | 74/543 |
| 2,786,359 | 3/1957 | Karlan et al. | 74/543 |
| 2,801,118 | 7/1957 | Amesbury | 74/543 |
| 2,884,250 | 4/1959 | Patterson | 403/50 |
| 3,279,834 | 10/1966 | Budzynski | 403/51 |
| 3,387,870 | 6/1968 | Gottschald et al. | 403/51 |
| 3,389,925 | 6/1968 | Gottschald | 403/51 |
| 3,484,808 | 12/1969 | Conterno | 74/543 |
| 3,530,495 | 9/1970 | Kindel | 403/51 |
| 3,561,281 | 2/1971 | Wilfert | 74/543 |
| 3,795,156 | 3/1974 | Neuscheler | 74/543 |
| 3,918,316 | 11/1975 | Reinhold et al. | 74/523 |
| 4,117,568 | 10/1978 | Bullock | 74/543 |
| 4,522,081 | 6/1985 | Mackin et al. | 403/50 |
| 4,617,834 | 10/1986 | Foggini | 74/543 |

FOREIGN PATENT DOCUMENTS

| | | | |
|---|---|---|---|
| 1965032 | 7/1971 | Fed. Rep. of Germany | 74/523 |
| 2252392 | 5/1974 | Fed. Rep. of Germany | 74/543 |
| 2252391 | 5/1974 | Fed. Rep. of Germany | 74/543 |
| 1196183 | 11/1959 | France | 74/543 |
| 1279914 | 6/1972 | United Kingdom | 74/523 |

Primary Examiner—Richard E. Moore
Assistant Examiner—Vinh Luong
Attorney, Agent, or Firm—Harness, Dickey & Pierce

[57] ABSTRACT

The coating comprises a center sheath enclosing the lever and terminated at one end with a knob grip which includes a lever end check seat, and at the other end with a bellows seal formed with a groove adapted to cooperate with a mating check seat provided on the console.

1 Claim, 2 Drawing Sheets

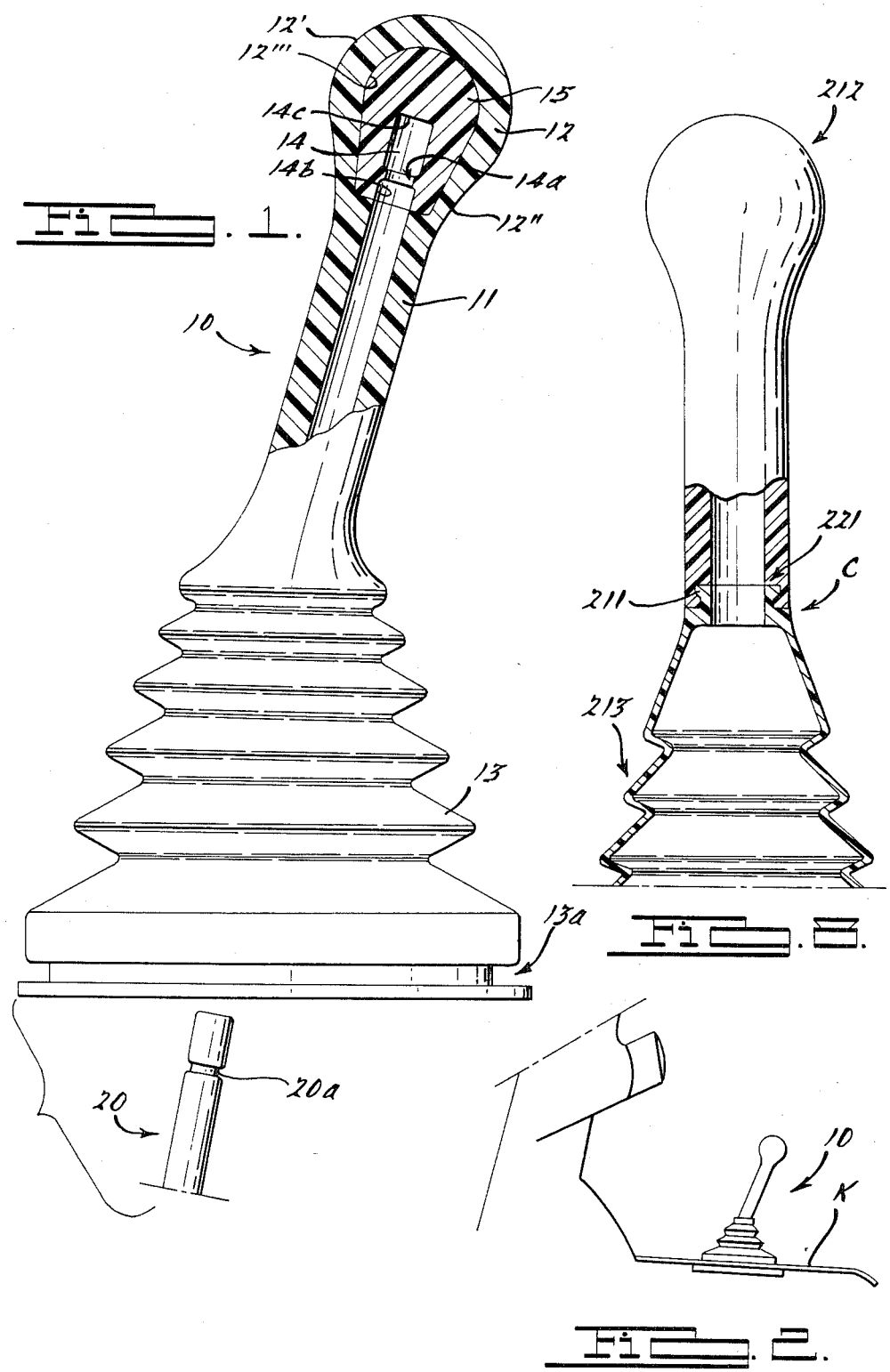

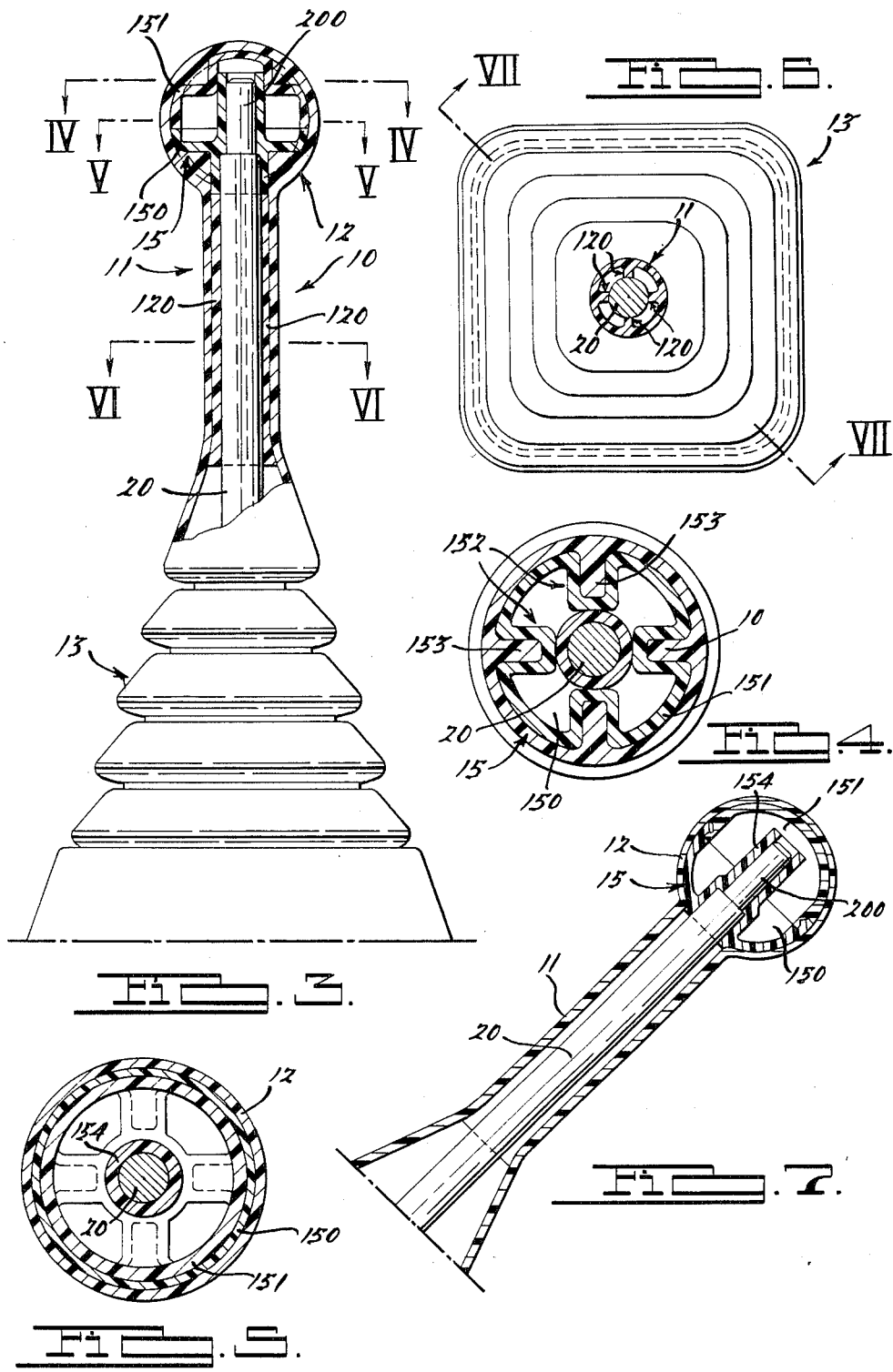

PREFORMED INTEGRAL COATING, PARTICULARLY FOR MOTOR VEHICLE GEAR SHIFT LEVERS

This application is a continuation of application Ser. No. 884,841, filed July 11, 1986, which was in turn a continuation of application Ser. No. 703,163, filed Feb. 19, 1985, which has since issued as U.S. Pat. No. 4,617,834, on Oct. 21, 1986.

BACKGROUND OF THE INVENTION

This invention relates to a coating or covering particularly intended for motorvehicle gear shift levers.

Currently used gear shift levers comprise a metal rod projecting from a central cabinet on the car floor, commonly termed "console", and are provided with a knob grip, as well as with a bellows seal arranged to protect the lever swivel joint at said console. The knob, which may have various configurations and sizes, is threaded onto or snap engaged with the rod end; the bellows seal is fitted over the rod and generally jointed or clamped to the console base. This prior arrangement of parts is scarcely effective as regards the bellows capability to prevent dust and moisture penetration, and is inconvenient when the bellows seal itself is to be replaced.

SUMMARY OF THE INVENTION

Accordingly the task of the invention is that of obviating the aforesaid deficiencies, while improving the aesthetic appearance of the gear shift lever assembly. According to one aspect of the invention, this task is achieved by a preformed integral or undivided coating, particularly for motorvehicle gear shift levers, characterized in that it incorporates the lever knob grip and lever protective bellows seal for the lever articulation joint.

Advantageously, the coating is of a polymeric material, and comprises a central sleeve enclosing the lever rod and terminating, without continuity breaks, at one end in a knob, including a force-fit check seat for the knob end, and, at the other end, in a bellows seal formed with a groove adapted to cooperate with a mating check seat provided on the console.

BRIEF DESCRIPTION OF THE DRAWINGS

The invention will be more clearly understood by making reference to the detailed description which follows, in conjunction with the accompanying illustrative, and not limitative, drawings, where:

FIG. 1 is a partly sectional elevation view of the integral coating according to one embodiment of the invention and of the upper portion of the gearshift lever rod in an exploded view;

FIG. 2 is a diagramatic view showing the coating installed;

FIG. 3 is a partly sectional elevation view of the coating or covering, according to a modified embodiment of this invention;

FIG. 4 is a cross-sectional view taken along the line IV—IV of FIG. 3;

FIG. 5 is a cross-sectional view taken along the line V—V of FIG. 3;

FIG. 6 is a further cross-sectional view, taken along the line VI—VI of FIG. 3;

FIG. 7 is a sectional view taken along the line VII—VII of FIG. 6; and

FIG. 8 is an elevation, partly sectional, view of a further modified embodiment of the invention.

DESCRIPTION OF THE PREFERRED EMBODIMENTS

Making reference initially to FIGS. 1 and 2, the reference numeral 10 generally designates the sheath-like coating or covering structure of this invention, and 20 the end of the metal rod constituting the gear shift lever of a passenger car.

In accordance with this invention, the sheath-like structure comprises a one-piece coating or covering 10, advantageously forced from a polymeric material such as soft PVC, comprises a central sleeve portion 11 which is terminated, as a one-piece construction and without continuity breaks, at one end in a knob grip defining upper portion or formation 12 generally of a bell-like shape, and at the other end in a lower bellows seal portion 13 for protecting the lever articulation joint or connection.

The knob formation 12 has a rounded top 12' and a downwardly frustoconically converging mantel formation 12". A hollow seat 12''' is provided within the knob formation 12, the hollow seat 12''' having a shape corresponding to the generally bell-like shape of the knob formation 12. As visible from the drawing, the axial extension of the hollow seat 12''' is greater than any transverse extension thereof. A core member 15 of relatively hard polymeric material is embedded and counter-shaped to said hollow seat 12'''. A cylindrical retaining cavity 14 as provided in said core member 15 and is adapted to accommodate the end 20 of the rod in force-fit relationship. The cavity 14 has a diameter corresponding to the diameter of the rod end 20 and is formed in insert core member 15, preferably made of a rigid polymeric material embedded in the knob 12 by a co-molding process, and is provided with an internally protruding concentric annular ridge or O-ring 14a adapted to engage, by elastic deformation of its material, in a corresponding groove 20a on the rod end 20, the ridge 14a having a diameter smaller than the diameter of the cylindrical cavity 14.

It will be noted from the drawing that the cylindrical cavity 14 has an open end 14b at a zone where the sleeve portion 11 departs from the frustoconically converging mantle and an opposite dead end 14c at a section where the rounded top 12' passes into the frustoconically downwardly converging mantle 12".

The bellows seal 13, preferably in the shape of a truncated pyramid, is in turn provided with an end groove 13a adapted to be engaged by the edge of a corresponding opening provided in the console K, wherefrom there extends the gear shift lever.

The coating or covering can be easily assembled by fitting it over the rod and pushing axially on the knob to produce the force-fit engagement of the rod end in the seat 14, as specified hereinabove. Then, the groove 13a of the bellows seal is engaged with the edge of the opening provided in the console K, as clearly shown in FIG. 2. The coating continuity ensures a perfectly tight seal, impervious to dust and moisture, while imparting the shift lever a pleasing aesthetic appearance.

In the modified embodiment shown in FIGS. 3 to 7, the insert 15 comprises a hollow element formed by two juxtaposed half-shells 150–151 of a rigid polymeric material. Such half-shells define a spherical profile solid with recessed radial lobes 152 in cruciform relationship, which delimit corresponding outer depressions 153 wherein the material of the coating 10 (FIG. 4) spreads to prevent any displacement of the insert relatively to the coating. The bottom half-shell 150 carries an axial tube 154 which, at the upper portion thereof, is surrounded, for checking and stiffening purposes, by the radial lobes 152 of the top half-shell 151. In the tube 154, there is force-fitted the depressed end 200 of the rod 20 which is urged to abut against the end of the tube. Again for lightening reasons, as well as to facilitate the fitting of the coating or covering over the lever 20, the sheath portion 11 of the coating has a bore of significantly larger diameter than the rod 20, and is provided with axial ribs 120, separated by respective lightening voids, which ribs lay adjacent the lever with the coating fitted in place.

In the embodiment of FIG. 8, the coating or covering is formed by two portions 212-213, advantageously (but not limitatively) formed both from a polymeric material, and respectively including the protective bellows seal for the swivel joint and the knob grip of the lever.

The two portions, which would be molded separately, are detachably interconnected at C by means of a fastener which ensures an apparent surface continuity to form, upon completion of the connection, an integral coating sleeve.

Preferably, the detachable fastener is implemented by providing on either of the two portions a collar 211 having an undercut toric profile, and on the other portion a mating seat 221; the collar and seat snap engaging together by virtue of the inherent elasticity of the material.

This coating or covering may be assembled either by separately fitting the two portions 212-213 over the lever and then interconnecting them, or by fitting the coating as a whole after connecting the two portions together.

I claim:

1. A transmission gearshift cover and gearshift rod assembly, in which said rod longitudinally extends from an aperture within a vehicle body, said cover and rod assembly comprising:

a bulbous insert member having an internal insert member bore adapted to receive an end of said gearshift rod;

a one-piece sheath member made from an elastic material having a knob portion which surrounds said insert member, a longitudinally-extending intermediate portion which closely surrounds said rod and extends along said rod and which converges from said knob portion toward said rod, said intermediate portion defining one or more radially inwardly directed ribs, and a bellows portion which diverges from said rod having mounting means for enabling said bellows portion to be secured to said vehicle body to enclose said aperture, wherein said sheath may be mounted to said vehicle by inserting said rod within said intermediate portion and into said insert member bore; and means for interlocking said insert member with said gearshift rod, including a radially inwardly directed annular rod groove formed in said rod generally adjacent said end of said rod and a radially inwardly directed projection formed in said insert member for interlockingly engaging said annular rod groove.

* * * * *